United States Patent
Modica et al.

(10) Patent No.: US 11,605,048 B2
(45) Date of Patent: Mar. 14, 2023

(54) SYSTEMS AND METHODS FOR PREDICTIVE IN-TRANSIT SHIPMENT DELIVERY EXCEPTION NOTIFICATION AND AUTOMATED RESOLUTION

(71) Applicant: Convey, LLC, Austin, TX (US)

(72) Inventors: Olivier Jean Marie Modica, Austin, TX (US); Jennifer Lynn Bebout, Austin, TX (US)

(73) Assignee: CONVEY, LLC, Austin, TX (US)

( * ) Notice: Subject to any disclaimer, the term of this patent is extended or adjusted under 35 U.S.C. 154(b) by 270 days.

(21) Appl. No.: 15/836,354

(22) Filed: Dec. 8, 2017

(65) Prior Publication Data

US 2018/0165635 A1 Jun. 14, 2018

Related U.S. Application Data

(60) Provisional application No. 62/432,514, filed on Dec. 9, 2016.

(51) Int. Cl.
*G06Q 10/08* (2012.01)
*H04L 67/025* (2022.01)
(Continued)

(52) U.S. Cl.
CPC ......... *G06Q 10/0833* (2013.01); *G06F 16/95* (2019.01); *G06Q 10/08* (2013.01); *G06Q 10/08355* (2013.01); *G06Q 30/02* (2013.01); *G06Q 30/0207* (2013.01); *H04L 65/40* (2013.01); *H04L 67/025* (2013.01); *H04L 67/06* (2013.01)

(58) Field of Classification Search
CPC ............... G06Q 10/0833; G06Q 10/08; G06Q 10/08355; G06Q 30/02; G06Q 30/0207; G06F 16/95; H04L 29/08; H04L 67/025
(Continued)

(56) References Cited

U.S. PATENT DOCUMENTS 6,772,130 B1 * 8/2004 Karbowski ............ G06Q 10/08
705/26.1
7,827,118 B1 * 11/2010 Smith, III ............ G06Q 10/025
705/333

(Continued)

OTHER PUBLICATIONS

Wang, Methodology for Analysis, Modeling and Simulation of Airport Gate-Waiting Delays, ProQuest Dissertations and Theses (Year: 2011).*

*Primary Examiner* — Jeff Zimmerman
*Assistant Examiner* — Mark C Clare
(74) *Attorney, Agent, or Firm* — Marshall, Gerstein & Borun LLP

(57) ABSTRACT

A shipping management system includes one or more computer systems coupled to a network and a data storage device. The shipping management system uses one or more ingest modules to collect shipping information from the computer systems of multiple carriers. The shipping management system uses one or more normalization modules to normalize carrier specific data. The shipping management system uses one or more prediction modules to analyze the normalized shipping information using a set of prediction rules. The shipping management system identifies carrier exceptions and generates predicted exceptions based on the normalized shipping information. The shipping management system can selectively generate notifications, take actions, and/or resolve identified and generated exceptions.

19 Claims, 13 Drawing Sheets

(51) Int. Cl.
*G06F 16/95* (2019.01)
*H04L 67/06* (2022.01)
*G06Q 30/02* (2012.01)
*H04L 65/40* (2022.01)
*G06Q 10/0833* (2023.01)
*G06Q 30/0207* (2023.01)
*G06Q 10/0835* (2023.01)

(58) Field of Classification Search
USPC ........................................................ 705/333
See application file for complete search history.

(56) References Cited

U.S. PATENT DOCUMENTS

| | | | |
|---|---|---|---|
| 7,996,328 B1* | 8/2011 | Lundberg | G06Q 10/08 |
| | | | 705/333 |
| 10,181,110 B1* | 1/2019 | Atkinson | G06F 40/174 |
| 2003/0097287 A1* | 5/2003 | Franz | G06Q 10/087 |
| | | | 705/28 |
| 2003/0097306 A1* | 5/2003 | Boucher | G06Q 10/08 |
| | | | 705/26.1 |
| 2010/0131420 A1* | 5/2010 | Williams | G06Q 10/083 |
| | | | 705/340 |
| 2010/0138355 A1* | 6/2010 | Kodger, Jr. | G06Q 10/025 |
| | | | 705/333 |
| 2010/0324959 A1* | 12/2010 | Templeton | G06Q 10/087 |
| | | | 705/334 |
| 2013/0198300 A1* | 8/2013 | Briggman | H04L 51/22 |
| | | | 709/206 |
| 2014/0279658 A1* | 9/2014 | Lievens | G06Q 10/083 |
| | | | 705/336 |
| 2016/0019628 A1* | 1/2016 | Udumudi | G06Q 30/0633 |
| | | | 705/26.8 |

* cited by examiner

| 1/27/16 | Wed | 1:48 PM | ✓ | Delivered |
|---|---|---|---|---|
| | | 12:46 PM | 🚚 | Out for delivery on time in Ceres, CA as stop 6 |
| 1/25/16 | Mon | 3:00 AM | 📅 | Your shipment is nearby! Please contact customer service at 800-XXX-XXXX to schedule a delivery appointment. |
| | | 3:00 AM | 🚚 | Arrived at destination terminal |
| 1/23/16 | Sat | 7:40 AM | 🚚 | Departed FRESNO, CA in route to destination terminal |
| | | 3:00 AM | 🚚 | Arrived at FRESNO, CA |
| | | 12:34 AM | 🚚 | Departed LOS ANGELES, CA in route to FRESNO, CA |
| 1/22/16 | Fri | 5:04 AM | 🚚 | Arrived at LOS ANGELES, CA |
| 1/21/16 | Thu | 11:34 AM | 🚚 | Departed PHOENIX, AZ in route to LOS ANGELES, CA |
| | | 8:27 AM | 🚚 | Arrived at origin terminal |
| | | 8:03 AM | 🚚 | Picked Up in GILBERT, AZ |
| 1/19/16 | Tue | 9:09 AM | ⚠ | Potential missed pickup - Call R+L CARRIERS at (800) XXX-XXXX to confirm a new pickup date — 202 |
| 1/14/16 | Thu | 4:56 PM | 🚚 | Pickup Scheduled |

FIG. 2

Shipment Exceptions

| BOL # | PRO # | Ref # | Shipper ZIP | Shipper Name | Pickup | Status | Est. Delivery | Consignee ZIP | Co Na |
|---|---|---|---|---|---|---|---|---|---|
| 1077916 | 990934730 | | 33167 | Dropshipper X | 4/4/16 | | 4/11/16 | 95437 | |
| 10805347573 | 990934750 | | 33167 | Dropshipper X | 4/21/16 | | 4/28/16 | 93282 | |
| 8698808680 | 221369633 | | 33167 | Dropshipper X | 8/16/16 | | 8/18/16 | 08831 | |
| 8688710369 | 76414275250 | | 94587 | Dropshipper Y | 3/14/16 | | 3/16/16 | 84722 | |
| 868915223 | 153210234 | | 94587 | Dropshipper Y | 4/11/16 | | 4/14/16 | 84737 | |
| 869056917 | 76414274700 | | 94587 | Dropshipper Y | 4/29/16 | | 5/6/16 | 02557 | |
| 869328025 | 76414274900 | | 94587 | Dropshipper Y | 6/9/16 | | 6/16/16 | 28216 | |
| 869363775 | 169701354 | | 94587 | Dropshipper Y | 6/14/16 | | 6/15/16 | 90018 | |
| 8697673350 | 153440807 | | 94587 | Dropshipper Y | 8/10/16 | | 8/18/16 | 10013 | |
| 870141832 | 169701462 | | 94587 | Dropshipper Y | 10/14/16 | | 10/18/16 | 80221 | |

Showing 1 to 10 of 1,749 entries

Contact Carrier Exceptions https://app.getconvey.com/shipment-exceptions?bundle=221856d5-9613-4467-8cd7-74fb4494de18

John Smith

Command Center

| | |
|---|---|
| Address Issue | 498 |
| Contact Carrier | 8 |
| Damaged | 234 |
| Return to Sender | 0 |
| Other | 0 |
| Missed Pickups | 256 |
| | 0 |

Search: schedule — 25

| | | Origin | Ship Date | Exception | Exception Detail | Est. Delivery | Destination | Carrier |
|---|---|---|---|---|---|---|---|---|
| 13552747 | BJ5P3AS PO<br>BBB3146443207 REF | Company 1<br>30102 | 8/24/17 | ⚠ Cannot Schedule | Unable to contact customer<br>8/28/17 9:24 AM | 8/31/17 | Deborah Metrick<br>10023 | CEVA |
| 100249515 | BM3F9WG PO<br>BBS9030673932 REF | Company 2<br>07503 | 8/24/17 | ⚠ Cannot Schedule | Unable to reach customer<br>8/28/17 1:23 PM | 8/31/17 | Lashawn Smith<br>07305 | Nonstop Delivery |
| 13551587 | BLSW6BD PO<br>BBS9030309168 REF | Company 3<br>75126 | 8/24/17 | ⚠ Cannot Schedule | Unable to reach customer<br>8/28/17 2:33 PM | 9/4/17 | Mahwish Sherwa<br>74014 | Nonstop Delivery |
| | | Company 4<br>19530 | 8/24/17 | ⚠ Cannot Schedule | Unable to contact customer<br>8/28/17 10:52 AM | 8/31/17 | Lisa Garrison<br>76034 | CEVA |
| | | Company 5<br>94804 | 8/24/17 | ⚠ Cannot Schedule | Unable to contact customer<br>8/28/17 10:09 AM | 8/31/17 | Cara Beckcom<br>77024 | CEVA |
| | | Company 6<br>33510 | | ⚠ Cannot Schedule | Unable to reach customer<br>8/25/17 3:25 PM | 9/4/17 | Adrian Rodriguez<br>33510 | Nonstop Delivery |
| | | Company 7<br>24055 | 8/23/17 | ⚠ Cannot Schedule | Left message<br>8/28/17 11:03 AM | | Kelsey Jeffreys<br>27540 | Zenith Freight L |
| | | Company 8<br>37745 | 8/23/17 | ⚠ Cannot Schedule | Unable to reach customer<br>8/28/17 11:50 AM | 9/4/17 | Mary Stuesser<br>53562 | Nonstop Delivery |

Contact Carrier Exceptions

| Origin | Ship Date | Exception | Exception Detail | Est. Delivery | Destination | Carrier |
|---|---|---|---|---|---|---|
| 617360471 BOL\|MOI Company 1 61354 | 9/25/17 | ⚠ Convey Missed Pickup Warning | Potential missed pickup 9/26/17 9:21 AM | 10/3/17 | Rory Mulholland 11768 | Pilot |
| 9852 BOL\|MOI 31366525 SOI Company 2 78620 | 6/14/17 | ⚠ Convey Missed Pickup Warning | Potential missed pickup 6/15/17 9:10 AM | 6/20/17 | Ann Brassard 92003 | Saia |
| 9444 BOL\|MOI 52246218 SOI Company 3 78620 | 6/14/17 | ⚠ Convey Missed Pickup Warning | Potential missed pickup 6/15/17 8:55 AM | 6/16/17 | Dave Dirren 85541 | Saia |
| 86810 BOL\|MOI Company 4 | 5/8/17 | ⚠ Convey Missed | Potential missed pickup | 5/15/17 | Robert Gahagan | Pilot |

CARRIER STATUS

Carrier 1

Exception
Missed Pickup Warning

◯ Unresolved

SUMMARY

- 0 Alerts Sent
- 0 Feedback Received
- 0 Alert Subscriptions
- 1 Carrier Exceptions
- 0 Carrier Communications
- 0 Internal Notes

CARRIER EVENTS ⓘ

[CONTACT CARRIER]

9/26/17 - Tuesday

9:21 AM  Potential missed pickup

[REVISE OR RESCHEDULE]
[CANCEL]

INTERNAL NOTES

[ADD NOTE]

There are no internal notes on this shipment.

John Smith 1100
1110

SYSTEMS AND METHODS FOR PREDICTIVE IN-TRANSIT SHIPMENT DELIVERY EXCEPTION NOTIFICATION AND AUTOMATED RESOLUTION

RELATED APPLICATIONS

This application claims a benefit of priority under 35 U.S.C. § 119 to U.S. Provisional Patent Application No. 62/432,514 filed Dec. 9, 2016, entitled "SYSTEMS AND METHODS FOR PREDICTIVE IN-TRANSIT SHIPMENT DELIVERY EXCEPTION NOTIFICATION AND AUTOMATED RESOLUTION", which is hereby fully incorporated by reference in its entirety.

TECHNICAL FIELD

The present disclosure relates generally to computer systems for shipping management. More particularly the present disclosure relates to online computer systems for predicting delivery exceptions and resolving delivery exceptions. More particularly, the present disclosure relates computer systems for multi-carrier shipping management with predictive exceptions and exception resolution.

BACKGROUND

The shipment of goods between shippers and recipients is typically carried out by carriers that own assets (trucks, cars, cargo ships, airplanes, rail cars) and that are contracted by manufacturers and retailers of those goods. In general, shipments are divided into two modes: "parcel" and "freight." Parcels are generally small, individual shipments handled by common carriers. Individual shippers can drop off these shipments at numerous locations (or have the shipments picked up) at their convenience. Pricing is generally determined by dimensional and/or weight. Carriers typically limit parcel shipments to particular weight and/or dimensions (e.g., 150 lbs. and 165" in length plus girth).

A shipment that exceeds the parcel limits is typically categorized as freight. Freight may be further divided into freight modes such as Full Truckload (FTL), Partial Truckload, Less Than Truckload (LTL), Air Freight, Ocean Freight, Rail Freight and Intermodal Freight. Freight pricing is determined on a number of factors including mode, route distance, fuel costs, density and value (weight, length, height), stow-ability, handling, liability, freight class, etc. Freight shipments are generally arranged with a carrier. Arrangements may include how the freight is to be loaded, how long it will take in transport, specialized equipment required or other information to facilitate the delivery.

Many carriers provide in-transit tracking data that identifies when goods have passed through various designated tracking locations along the route. This tracking information is typically accessible via web pages, links or spreadsheets. The data varies in quality, completeness and accuracy across carriers and modes, particularly as it relates to identifying issues that lead to late delivery (referred to as "exceptions").

Organizations that do a large amount of shipping may have a computer system that is tightly integrated with a carrier's system to facilitate shipping and shipment tracking. However, these systems suffer shortcomings with respect to exception management. As one problem, systems used by shippers do not typically identify exceptions across multiple carriers because there is a lack of consistency across carriers and modes as to what constitutes an exception. Moreover, conventional systems rely on the carriers to flag exceptions, but in many cases, the carriers do not flag all actual exceptions.

In addition to the lack of consistency, carriers do not update exception information in a timely manner. Accordingly, exceptions are often not exposed to shippers or intended recipients in a timely fashion that would allow the shipper or recipient to resolve the exception or take action in light of the exception.

The aforementioned issues create consistency and reliability issues for the shipper and recipient, leading to a host of experience, cost and product availability problems that ripple through supply chains of shippers and recipients.

SUMMARY OF THE DISCLOSURE

One particular embodiment is directed to a shipping management system having one or more computer systems coupled to a network and a data storage device. The shipping management system uses one or more ingest modules to collect shipping information from the computer systems of multiple carriers over a network. The shipping management system uses one or more normalization modules to normalize collected carrier specific data. The shipping management system uses one or more prediction modules to analyze the normalized shipping information using a set of prediction rules. The shipping management system identifies carrier exceptions and generates predicted exceptions based on the normalized shipping information. The shipping management system can selectively generate notifications, take actions, and/or resolve identified and generated exceptions.

The systems, methods, and products include one or more dashboards (for example, a web based dashboard generated by an interface module) accessible by a user that is associated with an account holder. From the dashboard, the user can view various metrics and access functions of a shipping system, such as scheduling shipments. In some embodiments, a user can click on an exceptions menu item to see all shipments associated with the account holder that have exceptions.

Numerous other embodiments are also possible.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions and/or rearrangements may be made within the scope of the disclosure without departing from the spirit thereof, and the disclosure includes all such substitutions, modifications, additions and/or rearrangements.

BRIEF DESCRIPTION OF THE DRAWINGS

The drawings accompanying and forming part of this specification are included to depict certain aspects of the disclosure. It should be noted that the features illustrated in the drawings are not necessarily drawn to scale. A more complete understanding of the disclosure and the advantages thereof may be acquired by referring to the following description, taken in conjunction with the accompanying drawings in which like reference numbers indicate like features and wherein:

FIG. 2 depicts a set of shipping data, including a predicted exception.

FIG. 7 depicts an exceptions dashboard provided by a shipping management system.

FIG. 8 depicts a shipping details view provided by a shipping management system.

FIG. 9 depicts another example of an exceptions dashboard provided by a shipping management system.

FIG. 10 depicts a partial view of the exceptions dashboard shown in FIG. 9 illustrating predictive exceptions.

FIG. 11 depicts a shipping details view provided by a shipping management system.

DETAILED DESCRIPTION

The invention and the various features and advantageous details thereof are explained more fully with reference to the nonlimiting embodiments that are illustrated in the accompanying drawings and detailed in the following description. Descriptions of well-known starting materials, processing techniques, components and equipment are omitted so as not to unnecessarily obscure the invention in detail. It should be understood, however, that the detailed description and the specific examples, while indicating preferred embodiments of the invention, are given by way of illustration only and not by way of limitation. Various substitutions, modifications, additions and/or rearrangements within the spirit and/or scope of the underlying inventive concept will become apparent to those skilled in the art from this disclosure.

Embodiments described herein provide a shipping management system that uses time-based and event-based information to predict whether an exception condition, such as a pickup or delivery delay or other shipment issue, is likely to be reached. Once an exception condition is flagged the system notifies interested parties through different means (API calls, SMS notifications, SQL updates) and takes other actions to resolve exceptions (including predicted exceptions).

The system is time-based because each update to a shipment history has a specific time value which is either in the past (e.g., shipment was scheduled on a specific date and time), current (e.g., latest status) or in the future (e.g., estimated delivery date and time). The system uses the time information to trigger predictive exceptions based on time cut-off triggers (e.g., scheduled pickup date is in the past and the shipment status is not updated) and duration triggers (e.g., expected delivery date is 2 days away but historically the shipment transit days from its current location is 3 days). Each of those triggers can be specific to a state, such as a "scheduled for pickup", "in transit" or "out for delivery" state or other defined state. The triggers may also be specific to a carrier or carrier and mode.

The system is event-based because each update to the shipment history is associated with a descriptive event status code or text. The system applies logic to extract relevant information from either the status code value or other pieces of information such as the status text, to trigger predictive exceptions.

The system combines time-based and event-based signals to trigger predictive exceptions that identify potential issues earlier than would normally be the case. The system further includes a framework for classifying and resolving exceptions.

Figure 1:
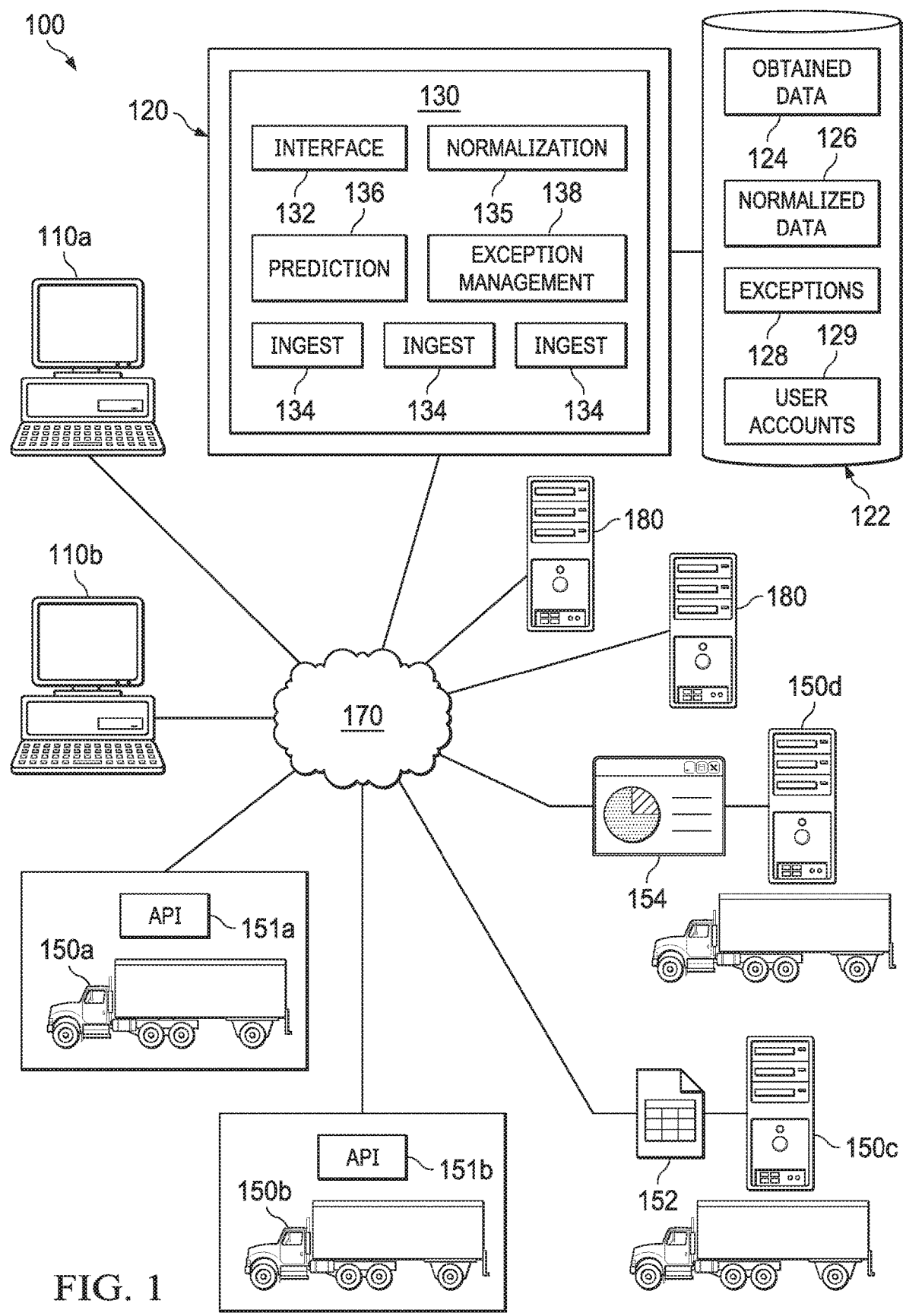
FIG. 1 depicts one embodiment of a topology which may be used with a shipping management system.

Embodiments of the systems and methods of the present invention may be better explained with reference to FIG. 1, which depicts one embodiment of a topology 100 which may be used to implement embodiments of the systems and methods of the present invention. Topology 100 comprises a set of entities including a shipping management system 120 that is coupled through network 170 to computing devices 110 (e.g. desktop computers, laptop computers, servers, smart phones), and one or more computer systems 150 ("carrier systems") at multiple carriers. Shipping management system 120 may also connect to various other external systems 180, such as e-commerce servers, ERP systems, TMS systems, ESP/SMS systems, CSR/CRM systems. Network 170 may be for example, a wireless or wireline communication network such as the Internet or wide area network (WAN), publicly switched telephone network (PTSN) or any other type of electronic communication link.

Shipping management system 120 may comprise one or more computer systems with central processing units executing instructions embodied on one or more computer readable media where the instructions are configured to perform at least some of the functionality associated with embodiments of the present invention. These applications may include a shipping management application 130 comprising one or more applications (instructions embodied on a computer readable media) configured to implement an interface module 132, data ingest modules 134, a normalization module 135, a prediction module 136 and an exception management module 138 utilized by the shipping management system 120.

Furthermore, shipping management system 120 may include data store 122 operable to store obtained data 124 collected from carrier systems 150, normalized data 126, predicted exception data 128, user accounts 129 and other data. User accounts 129 can include account information for account holders of accounts with shipping management system 120. The account holder information may be associated with an individual, shipper or an entity, such as a retailer, that uses drop shippers. The account holder information 129 may include credentials for one or more carrier systems 150 so that shipping management system 120 may log into a carrier system 150 on behalf of the account holders to schedule a pick up, request tracking information, etc.

Carrier systems 150 may provide in-transit tracking data through a variety of mechanisms.

Some carriers systems 150 may provide public application program interfaces (APIs) 151 that allow external systems to access tracking data. For systems with an API, an ingest module 134 may be programmed to make calls to the API 151 to collect tracking data related to shipments by that carrier being tracked by shipping management system 120.

Other carrier systems 150 allow users to register to receive files, such as spreadsheet 152 or other files, containing tracking data for one or more shipments. Accordingly, an ingest module 134 may be configured to request and receive files containing tracking information.

Other carrier systems 150 may only provide tracking data through a web page interface, such as web page 154. However, since the structure of a web page can be understood through observation, an ingest module 134 may be programmed to submit information, such as tracking numbers, through a web page and collect the returned data.

Ingest modules 134 may also be programmed to collect tracking data through other mechanisms. In addition, ingest modules may be programmed to collect data from other types of systems, such as weather tracking systems, mapping and traffic systems and other systems that provide data on events that may affect the timeliness of deliveries.

Ingest modules 134 may be configured to gather carrier data from multiple sources on a per-carrier basis in a variety of ways, including, but not limited to:

Integrating with a Web Service API using a service client to perform a request providing shipment information, such as a tracking number or reference number, to the service and processing the response from the service;

Providing shipment information to a web site, downloading the HTML content from a carrier tracking web page and extracting the relevant tracking information using rules identifying the actual tracking data on the page;

Receiving and processing shipment report files in the form of email attachments or web page attachments such as comma-separated or spreadsheet files; configured and scheduled through the carrier web interface when available.

Ingest modules 134 use a set of scheduling rules to schedule how often tracking data is requested from the different sources, unless the update frequency is controlled by the carrier as is the case when receiving shipment reports via email attachments. The scheduling rules take into consideration the current status of the shipment, the type of shipment, the expected delivery date, the carrier and whether a person or system is subscribed for updates (e.g. SMS text updates).

Some examples of scheduling rules include:

If the shipment is scheduled but not yet in transit then i) update once a day if the shipment is 2 or more days away from shipping; ii) else update once per 6 hours;

If the shipment is in transit then update once per hour;

If the shipment is out for delivery then update once per 15 minutes;

If the shipment is delivered then do not update.

Thus, in some embodiments, information about a shipment is collected from carrier systems 150 based on the last known status of the shipment.

The collected data may include, among other information, both temporal ("when") and location ("where") information that is used to build a full context of each tracking update. Each tracking update can contain one or more of status (status code or description), exception, location and time information for a shipment. The exception information will either be extracted as-is (if the carrier provides such information) or will be computed through status mapping using carrier-specific rules. In some embodiments, the system can intelligently fill in gaps in the collected information by leveraging known information about the shipment, such as origin and destination information. For example, if the location information for a "delivered" tracking update is not available, the shipment destination information can be used to fill in that information.

Normalization module 135 is configured to map between the carrier specific formats used by each carrier system 150 and normalized data. In accordance with one embodiment, normalization module 135 includes normalization rules to map the carrier tracking codes in the received carrier data to (internal) normalized tracking codes, examples of which are discussed below.

According to one embodiment, normalization module 135 is implemented using a set of carrier-specific status mappings that map specific status code values or status description values or both to one of a number normalized status with an exception flag available on each; along with an exception category when appropriate. It can be noted that more or fewer normalized statuses can be used. In general, the statuses correspond to various stages of a shipment (e.g., pickup scheduled, picked up, arrived at origin terminal, arrived at destination terminal, arrived at (other) terminal, departed terminal, out for delivery, delivered).

In one embodiment, shipping management system 120 defines a status mapping document (e.g., in JavaScript Object Notation (JSON) format or other format) which defines:

An input status code and/or status description.

A matching rule, which is either "matches exactly", "starts with" or "ends with", that is applied to the input status code or status description. In some embodiments, applying matching rules may include parsing carrier provided transit data for specific codes or descriptive words (e.g., "arrived").

A resulting normalized status code, exception flag and exception category for each matching input.

By defining a carrier-specific status mapping, normalization module 135 allows shipping management system 120 to compensate for differences between carriers using more or less specific rules based on the granularity for the source data.

In the example where shipping management system 120 defines a status mapping document in JSON format, the JSON document can be used to define rules per carrier and per status code and/or status description. The general structure of an exemplary JSON documents is as follows:

1. Carrier 1.1 Status code

If status pattern matches then set status and exception type, if appropriate

Status pattern is match exactly, starts-with or ends-with 1.2 Status description If status description pattern matches then set status and exception type, if appropriate Status pattern is match exactly, starts-with or ends-with Essentially, the JSON document provides a tree of decisions, starting with determining the carrier, since the rules are carrier-based. Next, a matching rule determines if the status pattern matches a status code value. In some examples, the status pattern could match a status code exactly. In other examples, the status pattern does not match exactly, but the status pattern "starts with", "ends with", etc. a value. If the rules do not match a status code, the system can map a fallback value, such as "in transit". Other examples are also possible.

Following is an example of a rules JSON document that can be used to define rules per carrier and per status code and/or status description:

```
"CARRIER_A": {
  "STATUS_VALUE": {
    "type": "SINGLE",
    "state": {
      "status": "IN_TRANSIT",
      "exception_type": "ATTEMPTED_DELIVERY"
    }
  }
}
```

As described above, normalization module 135 is configured to map between the carrier specific formats used by each carrier system and internal normalized tracking codes. Table 1 provides an example of normalized codes to which the normalization module 135 maps. The example shown in Table 1 shows exception categories. Column 1 of Table 1 lists the name of each exception type (e.g., "attempted_delivery", "available_for_pickup", etc.). Column 2 of Table 1 lists a description of each exception type listed in Column 1 (e.g., "Attempted Delivery", "Available for pickup by recipient at carrier terminal or access location", etc.).

TABLE 1

| Exception Type | Description |
| --- | --- |
| attempted_delivery | Attempted delivery. |
| available_for_pickup | Available for pickup by recipient at carrier terminal or access location. |
| consignee_refused | Consignee refused shipment. |
| convey_missed_estimated_delivery_date | Convey missed carrier's original estimated delivery date. |
| convey_missed_pickup | Convey missed pickup warning. |
| convey_predicted_delay | Convey delay warning. |
| customer_change_request | Customer change requested. May include a future delivery, hold or service level change. |
| damaged_or_shorted | Shipment damaged. |
| general_delay | General delay. |
| held_at_terminal | Shipment held at terminal waiting for additional delivery instructions. |
| incorrect_address | Incorrect address or contact information. |
| no_attempt_made_scheduled_next_day | Scheduled for next day. |
| reconsigned | A change was made to the recipient's delivery address. |
| remote_address | An area that is difficult to access, therefore the carrier may deliver there less frequently. |
| return_to_sender | Shipment returned to sender. |

TABLE 1-continued

| Exception Type | Description |
| --- | --- |
| schedule_appointment | Cannot schedule delivery. |
| shipment_correction | Shipment correction. Weight, dimensions and classifications are typical rating attributes corrected that result in higher or lower shipping costs. |
| shipment_label_replaced | Shipping label replaced. |
| tendered_late | Tendered late. |
| unable_to_track | Carrier unable to track shipment. |
| weather_delay | Weather delay. |

Table 2 is an example showing transaction information from multiple carriers (Carrier A, Carrier B, Carrier C) being mapped to normalized data. As shown, Column 1 of Table 2 identifies the carrier for each transaction. Column 2 of Table 2 shows a status code provided by the carrier. As described above, status codes from different shippers are not standardized. Column 3 of Table 2 shows the normalized status (in this example, one of the normalized exceptions listed in Table 1).

TABLE 2

| Carrier | Status Code | Exception |
| --- | --- | --- |
| Carrier A | Your shipment has been delayed. Please contact the destination service center | held_at_terminal |
| Carrier B | PODP | damaged_or_shorted |
| Carrier C | Refusd | consignee_refused |

Table 3 is a table showing examples of shipping records. In the example shown, each shipment has an internal shipment id (Column 1) that the shipping management system 120 uses to identify each shipment. Column 2 of Table 3 shows the normalized status of each respective shipment. Column 3 of Table 3 identifies the carrier. Each shipment includes a unique tracking number, provided by the carrier. If the shipment has an exception, the normalized exception type is identified in Column 5 of Table 3. In general, the most recent exception may be stored in a shipping record. Finally, Columns 6 and 7 show the origin and destination of each shipment. A shipping record will typically include more information than is shown in Table 3, which, for clarity, shows just a few exemplary fields.

TABLE 3

| id | status | carrier_name | tracking_number | exception_type | origin | destination |
| --- | --- | --- | --- | --- | --- | --- |
| 1000 | In_transit | Acme Freight | A1002000 | NULL | Dallas, TX | Austin, TX |
| 1001 | In_transit | Parcel | 1Q120303 | damaged_or_shorted | San Francisco, CA | Los Angeles, CA |

Table 4 is a table showing shipment events for shipment_id 1000. In the example shown, each shipment event has an internal id (Column 1). Column 2 of Table 4 shows the shipment_id, which identifies the shipment. Column 3 of Table 4 shows the normalized status value. Column 4 of Table 4 shows the normalized exception value, if the shipment event has an exception (for example, event 1002 show exception "held_at_terminal"). Finally, Column 5 of Table 4 shows the time and date that the event was created. The time and date values can be used to determine the order in which the events occurred, since they may not all be received in order.

TABLE 4

| id | shipment_id | status | exception_type | created_datetime |
|----|-------------|--------|----------------|------------------|
| 1001 | 1000 | Scheduled | NULL | 2017-11-20T01:13 |
| 1002 | 1000 | In_transit | held_at_terminal | 2017-11-21T13:05 |
| 1003 | 1000 | In_transit | NULL | 2017-11-23T06:40 |

Prediction module 136 is configured to evaluate the normalized data and predict exceptions. Prediction module 136 may be programmed with rules to identify potential exceptions. If a predicted exception is determined for shipment 1000, the predicted exception can be added as an event to the shipment events in Table 4 for shipment 1000. The shipping record for shipment_id 1000 may also be updated to reflect the predicted exception as the most recent exception.

For example, a rule may specify that if a shipment is marked as "pickup scheduled", but no action has occurred on a shipment for "x" number of hours, the shipment can be flagged as having a potential exception (also referred to as a "predicted exception" herein). For example a rule can specify that if a shipment is scheduled but is not in transit within 12 hours of the ship date, then a missed pickup exception can be set (e.g., an event with "convey_missed_pickup" from Table 1 can be added to the event records for the shipment and the shipping record updated). In another example, if a shipment is not delivered and the estimated delivery date has passed then, then a missed estimated delivery date can be set (e.g., "convey_missed_estimated_delivery_date" from Table 1). FIG. 2 is an example illustrating a set of shipping data where a predicted exception 202 is indicated because the carrier did not pick up a shipment within a specified time period.

The prediction rules may be carrier specific. Predictive exceptions can be deduced from carrier status values based on actual shipment research. For example, if it is known that a particular carrier typically takes 18 hours to update its tracking data after picking up a shipment, a rule associated with the carrier may be configured to flag an exception if there is no action on a shipment (as can be determined from the carrier's tracking data) for 24 hours. This accounts for both the time it takes the carrier to pick up the shipment and the time it takes the carrier to update its tracking data. However, if it is known that a second carrier updates its tracking data within an hour of pickup, a rule for that carrier could be configured to mark an exception if there is no action on the shipment for 8 hours or other configured time period.

Rules may also be applied based on tracking data indicating that a shipment has arrived at or departed from a tracking location (e.g., a terminal). For example, a rule may be configured to flag a potential exception if the normalized tracking data for a shipment indicates that the shipment arrived at a tracking location but does not show further action on the shipment within 12 hours (or other time period, which in some embodiments may be carrier dependent). Similarly, a rule may be configured to flag a potential exception if the normalized tracking data for the shipment indicates that the shipment left a tracking location, but shows no further action on the shipment for 12 hours (or other time period, which in some embodiments may be carrier dependent).

In addition, rules may incorporate historical data to identify exceptions. For example, shipping management system 120 may track transit times by carrier and mode from origin zip codes to destination zip codes. Even more particularly, the transit times may be tracked based on time of year, class of package ship, weight of package and other factors. A rule may be specified such that prediction module 136 flags an exception if the transit time for a shipment by a carrier/mode from an origin zip code to a destination zip code exceeds by a specified amount, the average historical transit time for that zip code pair and time year for the carrier/mode.

In addition to analyzing in-transit tracking information, prediction module 136 may use information from other systems 180 to predict exceptions. For example, shipping management system may maintain information on historical routes between origin zip codes and destination zip codes by carrier/mode (e.g., such as the most common tracking locations for deliveries from an origin to destination zip code). If prediction module 136 detects a forecasted severe weather event along the route, prediction module 136 may predictively identify a possible exception based on forecasted weather event.

Prediction module 136 may also apply other rules to identify events that, while not being exceptions, may affect the delivery of a package. As one example, certain carriers may require a recipient to sign for a package under particular circumstances. If an order meets the criteria requiring a recipient signature, prediction module 136 can flag the event when prediction module 136 detects that the package has reached the final terminal or achieved a particular status (e.g., "out for delivery"). For example, in one embodiment, parcel packages can be marked as requiring a signature if the order or carrier data provides this information, whereas freight packages are marked as requiring a signature (appointment) if carrier data provides this information or if the package reaches the destination terminal.

Exception management module 138 is configured with rules for classifying exceptions and taking actions based on exceptions (e.g., exceptions contained in the ingested (normalized) tracking data or predictive exceptions identified by prediction module 136) or other events (e.g., a signature required event). In accordance with one embodiment, each exception can be classified as follows:

- If the exception can be proven by using additional data then it is classified as a specific exception. For example, a potential transit delay exception that can be proven using local weather data can be classified as "Weather Delay". If the exception cannot be proven using additional data it can simply be classified as "Potential Delay".
- If the exception cannot be proven then it remains as predictive and potential until it can be proven with data or updated by another system or human.

The rules for classifying an exception may take into account a variety of information. In some cases, exception management module 138 may be configured to query other sources 180 for data relevant to a shipment (or review data collected previously collected from other sources 180) and apply rules to the data to classify predicted exceptions. For example, if prediction module 136 flags an exception due to a delay at a particular tracking location (a predicted delay), exception management module 138 may query a weather tracking system 180 or analyze weather data to determine the weather in the area of the tracking location. If severe weather is indicated, exception management module 138 may classify the predicted exception as a weather delay as noted above.

In another embodiment, exception management module 138 may be configured to generate a notification to a carrier alerting the carrier of the potential delay so that the carrier can determine if there is an actual delay in the shipment.

When exception management module 138 determines that a shipment has an exception, exception management module 138 may trigger various actions to resolve the exception. Exception management module 138 can use an exception code classification that identifies if an exception is a candidate for automated resolution and, if so, generates the required notifications and communication (via SMS, email, API, database updates (e.g., SQL updates) data ingestion).

Each exception can be resolved as follows based on the exception classification:
  Automated resolution
  Communication resolution
  No resolution The rules specifying the actions to take for an exception may depend on the exception classification, the shipper, the carrier/mode, the recipient, location where the exception occurred and other information.

Actions may include sending notifications to account holders, shippers, recipients or carriers, interacting with shipper or carrier systems to resolve an exception or taking other actions. For example, a missed pick up exception may trigger an action to notify the shipper to reschedule the pickup or, in another example, a missed pick up exception may trigger an action that causes shipping management system 120 to automatically reschedule the pick up on behalf of the shipper (e.g., through an API 151).

As another example, a weather delay exception may trigger sending a notification of a potential weather delay to the intended recipient of the shipment. In another example, exception management module 138 may automatically re-route a shipment or source the shipment from a different originating location if possible.

In some cases, notifications may include information to facilitate resolving the exception. For example, in FIG. 2, the notification for "potential missed pickup" exception includes contact information for the carrier so that the shipper can reschedule pickup.

Figure 3:
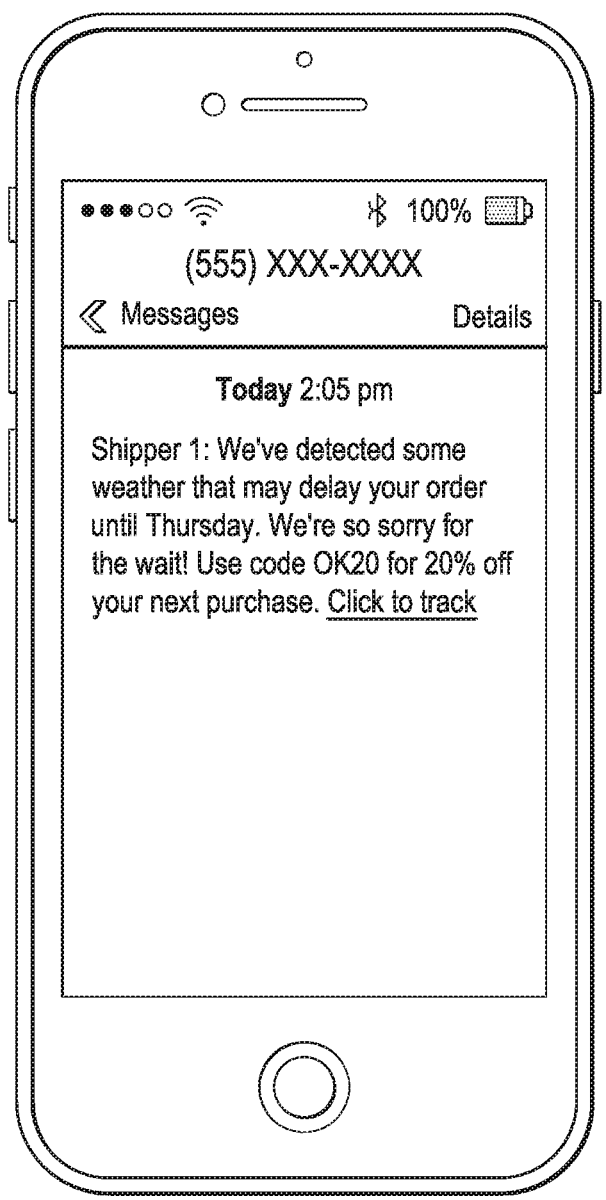
FIG. 3 depicts a weather delay notification with additional content selected by a shipper.

In some embodiments, a shipper may specify content for notifications sent to recipients of shipments from that shipper. For example, the shipper may specify that, if an exception occurs (or certain type of exception occurs) in a shipment, the recipient should be sent a notification indicating that the next shipment to that recipient will be shipped free. FIG. 3, for example, illustrates a weather delay notification with additional content selected by the shipper. In the example of FIG. 3, the recipient receives a discount code for a future purchase.

Figure 4:
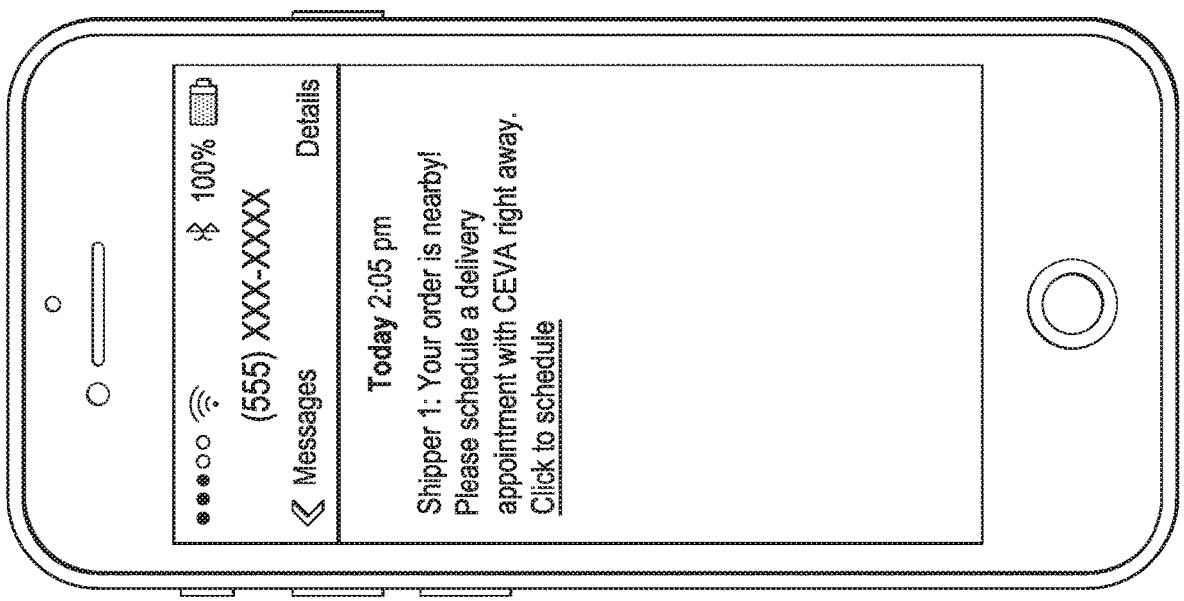
FIG. 4 depicts a notification provided by a shipping management system in the form of a text message.
Figure 5:
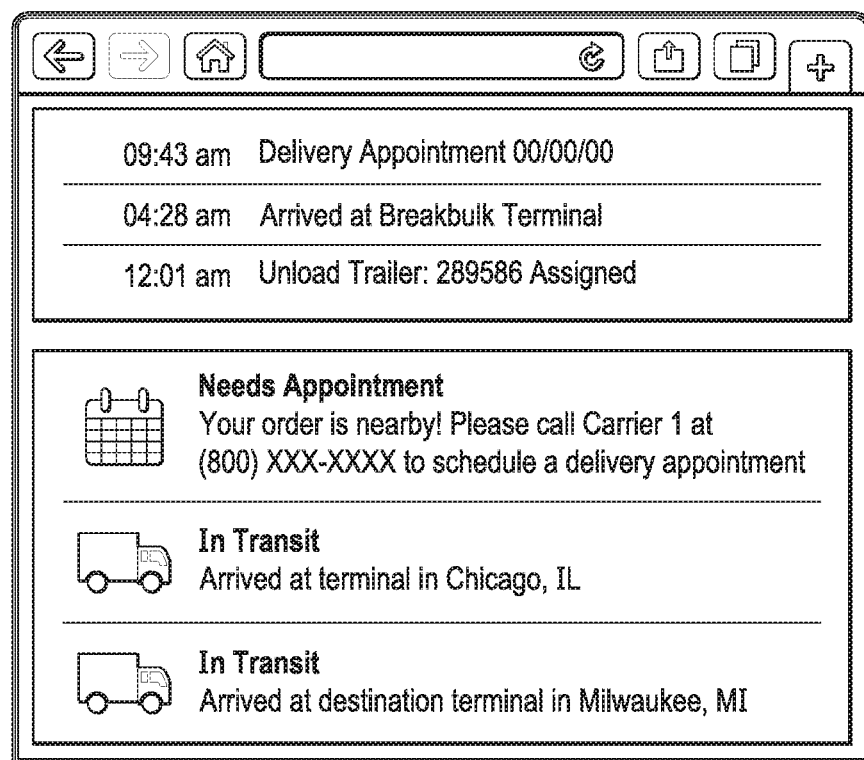
FIG. 5 depicts a notification provided by a shipping management system in the form of a web page notification.

Exception management module 138 may also include rules for taking actions on other events identified by prediction module 136. For example, exception management module 138 can provide the notification to the intended recipient of the delivery that requires a signature so that the intended recipient knows he or she should be available to sign for the package or risk delaying delivery. FIG. 4, for example, illustrates one embodiment a notification provided by shipping management system 120 in the form of a text message notifying a recipient that he or she should schedule a delivery appointment. FIG. 5 illustrates one embodiment of a notification in the form of a web page notification that can be provided to a recipient through a web interface.

As noted above, the rules may take into various factors for determine what actions to take in light of an exception. In one embodiment, shipping management system 120 may track recipient value to a customer. This information may be provided explicitly by a user (e.g., a user may classify each recipient as "tier 1" recipient, "tier 2" recipient, etc.) or shipping management system 120 may apply rules to shipping data to determine recipient value. The "tier 1" recipients of a shipper (or account holder) may be, for example, a recipient that receives x number of shipments a month from an account holder, or greater than a particular percentage of an account holder's shipments, or is in the top y recipients for the account holder. The recipient status may be a factor used by exception management module 138 in determining the exceptions/predicted exceptions to surface to the account holder (if different than the shipper), shipper, the recipient notification channel(s) used, the indicated urgency of a notification.

Exception management module 138 may further include rules for clearing exceptions. A predictive exception, in some embodiments, is cleared when a more recent tracking update is received that negates an existing predictive exception. Once a package has been shipped an existing "missed pickup" predictive exception will be cleared.

For example, if prediction module 136 flags an exception because the tracking data for a shipment indicated no action on a shipment within 12 hours of the shipment arriving at a tracking location, but then the next update of the tracking data indicates that the shipment left the tracking location, exception management module 138 may be configured to clear the exception, send a follow-up notification to the account holder, shipper or recipient, remove a prior notification from a web page or take another action.

As can be understood from the foregoing, shipping management system 120 can predict exceptions according to a defined set of rules and provide notifications to account holders (e.g., online retailers) shippers, recipients or carriers based on the predicted notifications. In addition, shipping management system can detect other types of events and take actions based on those events.

Shipping management system 120 may provide a wide degree of functionality including utilizing one or more interface modules 132 configured to, for example, receive and respond to queries from users at computing devices 110. It will be understood that the particular interface module 132 utilized in a given context may depend on the functionality being implemented by shipping management system 120, the type of network 170 utilized to communicate with any particular entity, the type of data to be obtained or presented, the time interval at which data is obtained from the entities, the types of systems utilized at the various entities, etc. In some embodiments, these interfaces may include, for example web pages, web services or APIs.

In operation, shipping management system 120 may provide a system through which shippers can select carriers, schedule pick up of shipments and track shipments. Shipping management system 120 may include account information 129 so that shipping management system 120 may log into a carrier system 150 on behalf of an account holder (e.g., a retailer or shipper) to schedule pick up of a shipment, request tracking information, etc. In this case, a carrier system 150 may provide a tracking number directly to shipping management system 120 because, from the perspective of the carrier system 150, shipping management system 120 is a shipper's computer system. In other cases, a shipper may make a shipment without going through shipping management system 120, but can provide a tracking number to shipping management system 120 so that shipping management system 120 can request the appropriate tracking information from the carrier system 150.

A user at a computing device 110 may access the shipping management system 120 through the provided interfaces provided by interface modules 132 and specify certain parameters, such as a carrier, mode, shipping information, a tracking number and other information. Shipping management system 120 can generate interfaces using interface module 132 and data determined from the processing, and present these interfaces to the user at the user's computing device 110. More specifically, in one embodiment interfaces may visually present shipping information, including predicted exceptions to the user.

The shipping management system 120 may receive a request from a client computer for an interface containing data associated with a user account and substantially simultaneously initiate generation of a responsive interface, such as a web page. The responsive interface may include predicted exception data. Because the predicted exceptions returned are, in some embodiments, determined prior to receiving the request and stored in a normalized format across carriers, the shipping management system can quickly retrieve the predicted exceptions for shipments related to an account and generate an interface that presents predicted exceptions from multiple carriers. Thus, shipping management system 120 can respond to a request for an interface in the times expected by users of the Internet and without a web browser timing out.

Figure 6:
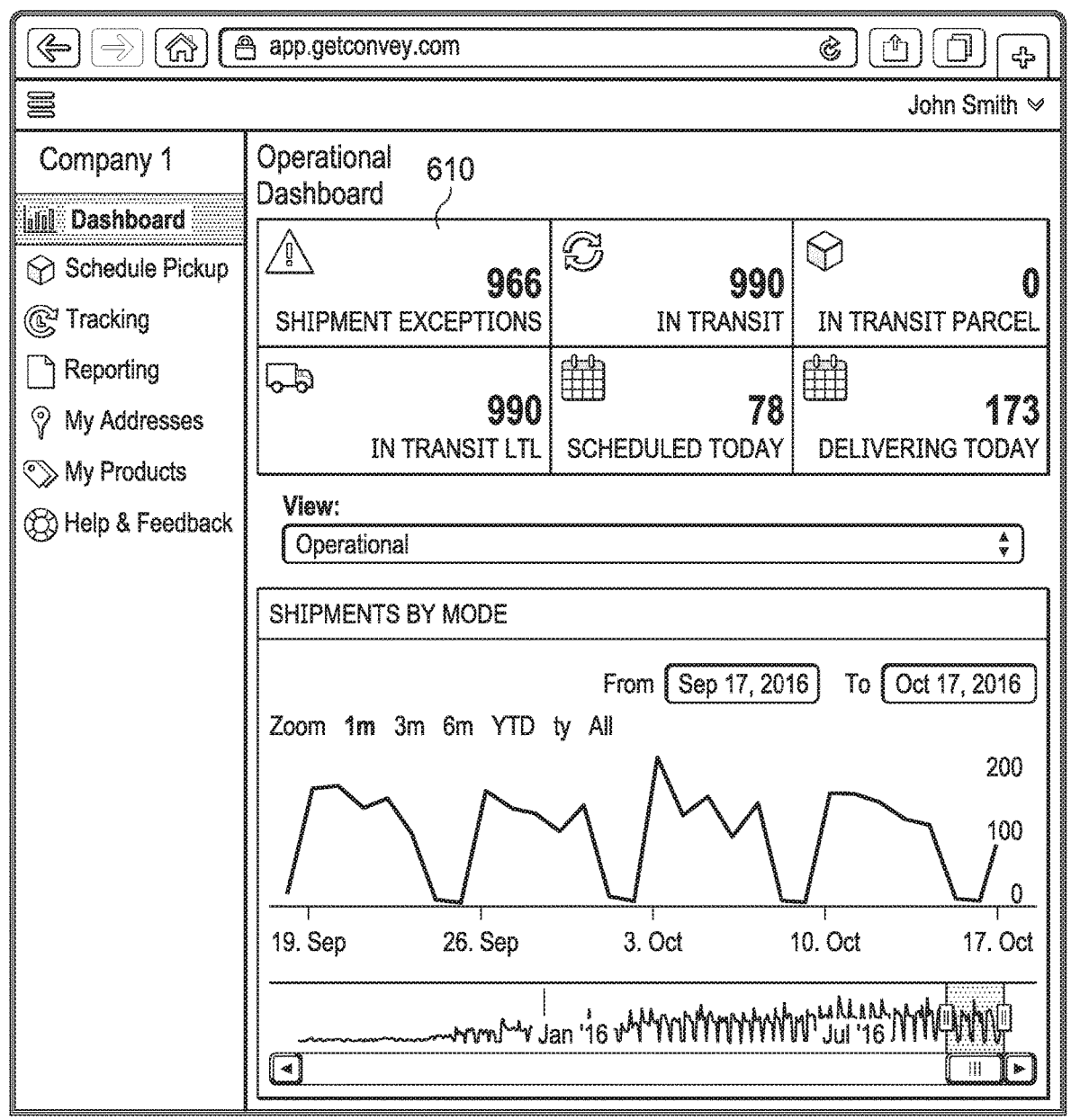
FIG. 6 depicts a dashboard provided by a shipping management system.

FIG. 6 illustrates an embodiment of a dashboard provided by shipping management system 120 (e.g., a web based dashboard generated by interface module 132) to a user ("John Smith") associated with an account holder ("Company 1"). From the dashboard, the user can view various metrics and access functions of shipping system 120, such as scheduling shipments.

Figure 8:
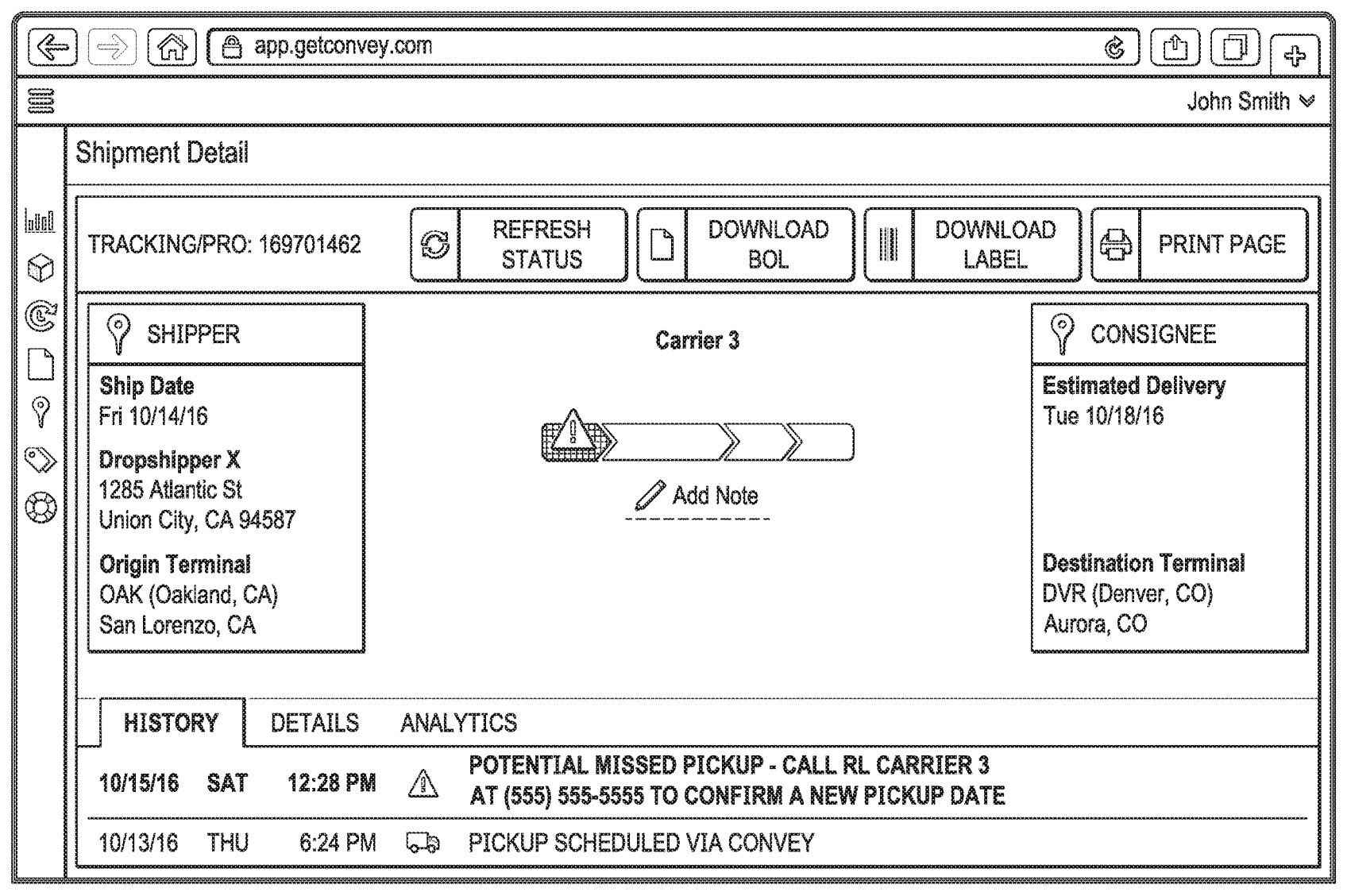

According to one embodiment, the user can click on "Exceptions" 610 to see all shipments associated with that account holder that have exceptions, including, in some embodiments, shipments by drop shippers shipping on behalf of the account holder. One embodiment of an exceptions dashboard is illustrated in FIG. 7. In this embodiment, individual shipments are presented with various visual indicators (icons, colors, etc.) to indicate the status of each shipment (e.g., orange with triangle indicates a predictive exception such as a potential missed pickup 800, red with calendar 810 indicates that the shipment requires an appointment, red with warning triangle 820 indicates a carrier reported exception, green with checkmark 830 indicates that a shipment that had an exception has been delivered.) The user can select a particular shipment by clicking on the shipment to drill down into the details of the shipment (FIG. 8). In the example of FIG. 8, the user can view information such as the ship date, the origin, the destination, the estimated delivery, carrier exceptions, and the shipping history.

FIG. 9 shows another embodiment, where a user can choose to view an exceptions screen to see all shipments associated with that account holder that have exceptions. In this embodiment, individual shipments are presented and the exception for each shipment is identified in column 900. More details about the exception are provided in column 910. As before, the user can select a particular shipment by clicking on the shipment to drill down into the details of the shipment. FIG. 10 shows a partial view of the exceptions screen shown in FIG. 9, but with predictive exceptions (column 1000) shown for multiple carriers (column 1010). The user can select a particular shipment by clicking on the desired shipment to drill down into the details of the shipment (FIG. 11). In this example, the user can view the carrier status 1100, which indicates a "Missed Pickup Warning" exception. The user can also view a summary 1110 of the shipment that includes various information such as alerts sent, feedback received, the number of carrier exceptions, etc.

Figure 12:
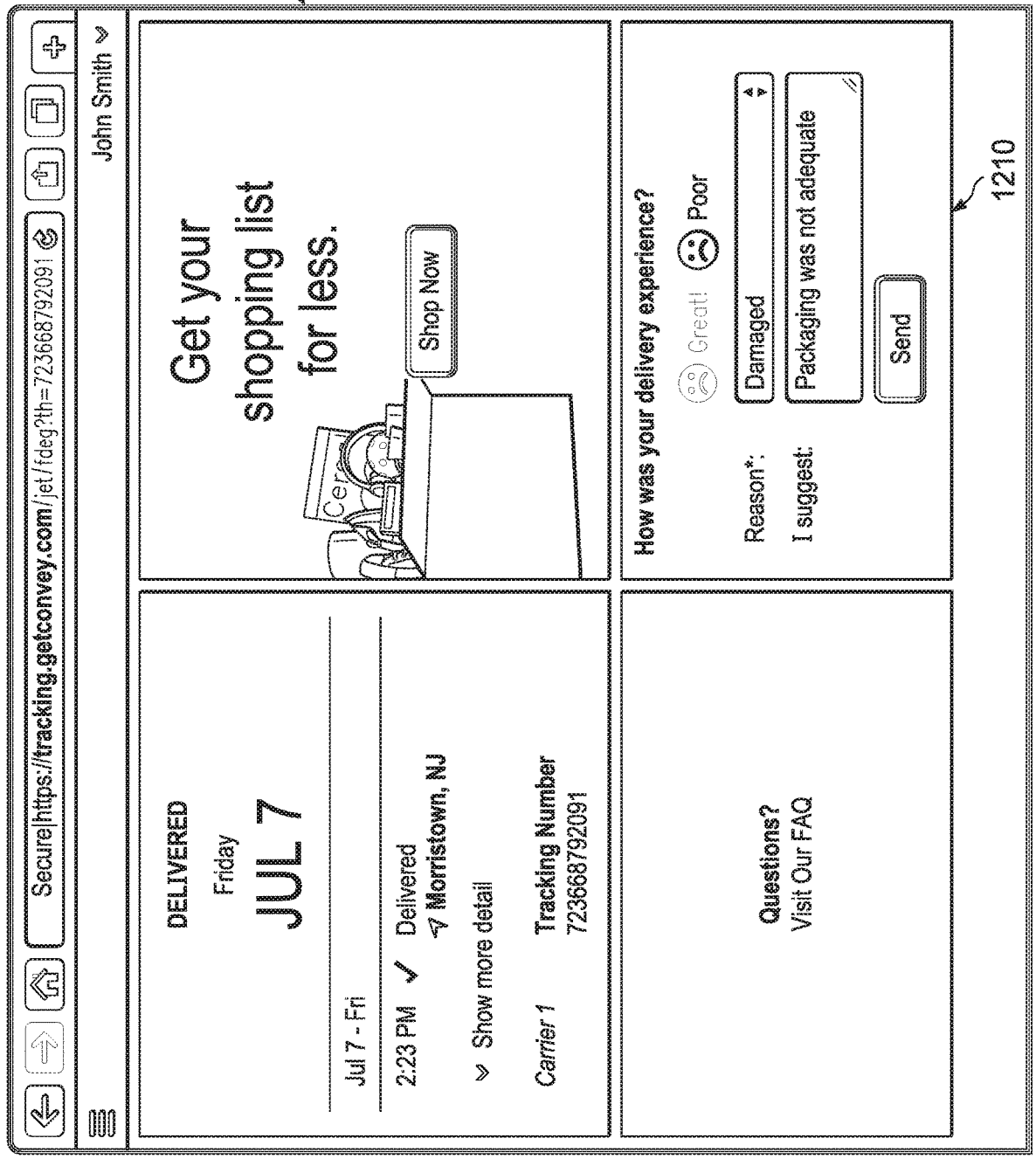
FIG. 12 depicts a tracking details screen including an area for customer input.

The shipping management system 120 also allows customers to provide input that can be used to generate exceptions. For example, FIG. 12 shows a tracking details screen 1200 that includes an area 1210 where a customer can provide input. In this example, the customer can rate the delivery experience as "Great" or "Poor". The customer can also provide a reason for the rating (in this example, the customer selected "Damaged"), and provide a suggestion to improve the customer's experience in the future. The information provided by the customer can be used for any desired purpose, including generating exceptions. For example, using the example shown in FIG. 12, an exception can be generated indicating that the shipment was damaged.

Figure 13:
FIG. 13 depicts an example of a notification to an end user indicating that a delivery appointment is required.

The shipping management system 120 can also generate notifications to end users either suggesting an action and/or providing notification of a future action. FIG. 13 shows an example of a notification to an end user indicating that a delivery appointment is required (for example, due to a bad address, etc.). The notification recommends that the end user provide additional information, and notifies the end user to expect to be contacted by the carrier.

Embodiments of a hardware architecture for implementing certain embodiments is described herein. One embodiment can include one or more computers communicatively coupled to a network. As is known to those skilled in the art, the computer can include a central processing unit ("CPU"), at least one read-only memory ("ROM"), at least one random access memory ("RAM"), at least one hard drive ("HD"), and one or more input/output ("I/O") device(s). The I/O devices can include a keyboard, monitor, printer, electronic pointing device (such as a mouse, trackball, stylus, etc.), or the like. In various embodiments, the computer has access to at least one database over the network.

ROM, RAM, and HD are computer memories for storing computer instructions executable (in other which can be directly executed or made executable by, for example, compilation, translation, etc.) by the CPU. Within this disclosure, the term "computer-readable medium" is not limited to ROM, RAM, and HD and can include any type of data storage medium that can be read by a processor. In some embodiments, a computer-readable medium may refer to a data cartridge, a data backup magnetic tape, a floppy diskette, a flash memory drive, an optical data storage drive, a CD-ROM, ROM, RAM, HD, or the like.

At least portions of the functionalities or processes described herein can be implemented in suitable computer-executable instructions. The computer-executable instructions may be stored as software code components or modules on one or more computer readable media (such as non-volatile memories, volatile memories, DASD arrays, magnetic tapes, floppy diskettes, hard drives, optical storage devices, etc. or any other appropriate computer-readable medium or storage device). In one embodiment, the computer-executable instructions may include lines of compiled C++, Java, HTML, or any other programming or scripting code.

Additionally, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

As used herein, the terms "comprises," "comprising," "includes," "including," "has," "having" or any other variation thereof, are intended to cover a non-exclusive inclusion. For example, a process, article, or apparatus that comprises a list of elements is not necessarily limited only those elements but may include other elements not expressly listed or inherent to such process, article, or apparatus. Further, unless expressly stated to the contrary, "or" refers to an inclusive or and not to an exclusive or. For example, a condition "A or B" is satisfied by any one of the following: A is true (or present) and B is false (or not present), A is false (or not present) and B is true (or present), and both A and B are true (or present).

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms. Language designating such nonlimiting examples and illustrations includes, but is not limited to: "for example," "for instance," "e.g.," "in one embodiment."

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component.

What is claimed is:

1. A system for enhancing electronic shipment tracking comprising:
    one or more computer systems;
    a data storage device coupled to the one or more computer systems, the data storage device storing a set of shipping records for a plurality of shipments across a plurality of carriers, each shipping record in the set of shipping records associating a respective shipment from the plurality of shipments with a respective carrier from the plurality of carriers; and
    wherein the one or more computer systems is configured to:
        connect to a plurality of carrier systems over a network, the plurality of carrier systems including a carrier system for each of the plurality of carriers;
        automatically collect current shipping information for the plurality of shipments from the plurality of carrier systems by one or more ingest modules, wherein the current shipping information includes, for each shipment from the plurality of shipments, electronic shipment tracking data for the respective shipment formatted according to a carrier specific format used by the respective carrier;
        define a set of common normalized tracking codes;
        for each shipment from the plurality of shipments, map the electronic shipment tracking data for the respective shipment from the carrier specific format used by the respective carrier to the defined set of common normalized tracking codes by one or more normalization modules to generate normalized shipping information for the respective shipment;
        for each shipment from the plurality of shipments, store the generated normalized shipping information for the respective shipment on the data storage device as an event associated with the respective shipment;
        analyze the normalized shipping information for a first shipment of the plurality of shipments using a prediction rule specific to a carrier of the plurality of carriers, the carrier being associated with the first shipment, including:
            detect a first type of event for the first shipment,
            identify a duration that the carrier typically takes to update tracking data corresponding to an expected next action after occurrence of the first type of event,
            determine that a time duration that exceeds the duration that the carrier typically takes to update the tracking data without detection of the expected next action for the first shipment has elapsed, the time duration specified in the prediction rule specific to the carrier, and
            based on determining that the time duration without detection of the expected next action for the first shipment has elapsed, classify a predicted exception for the first shipment;
        based on classifying the predicted exception for the first shipment, enhancing the shipping record for the first shipment with the predicted exception and automatically sending a notification to a party associated with the first shipment of the predicted exception to provide the party with up-to-date information for the first shipment; and
        provide a graphical user interface to allow a remote user with permission to access the set of shipping records to view any current predicted exceptions associated with the plurality of shipments, including the predicted exception.

2. The system of claim 1, wherein the one or more computer systems is further configured to take one or more actions to resolve the predicted exception.

3. The system of claim 1, wherein at least one of the one or more ingest modules is adapted to request current shipping information for one or more shipments of the plurality of shipments from a first carrier system using a web service API according to a schedule based on a tracking status of the one or more shipments.

4. The system of claim 1, wherein at least one of the one or more ingest modules is adapted to programmatically provide information identifying one or more of the plurality of shipments to a web site and download responsive tracking data from a web page of the web site.

5. The system of claim 1, wherein at least a portion of the current shipping information from at least one of the carriers is collected by at least one of the one or more ingest modules by receiving and processing shipment report files.

6. The system of claim 5, wherein the shipment report files are comma-separated or spreadsheet files.

7. A method for enhancing electronic shipment tracking comprising:
- storing a set of shipping records for a plurality of shipments across a plurality of carriers, each shipping record in the set of shipping records associating a respective shipment from the plurality of shipments with a respective carrier from the plurality of carriers;
- connecting to a plurality of carrier systems over a network, the plurality of carrier systems including a carrier system for each of the plurality of carriers;
- automatically collecting current shipping information for the plurality of shipments from the plurality of carrier systems, wherein the current shipping information includes, for each shipment from the plurality of shipments, electronic shipment tracking data for the respective shipment formatted according to a carrier specific format used by the respective carrier;
- defining a set of common normalized tracking codes;
- for each shipment from the plurality of shipments, mapping the electronic shipment tracking data for the respective shipment from the carrier specific format used by the respective carrier to the defined set of common normalized tracking codes by one or more normalization modules to generate normalized shipping information for the respective shipment;
- for each shipment from the plurality of shipments, storing the generated normalized shipping information for the respective shipment as an event associated with the respective shipment;
- analyzing the normalized shipping information for a first shipment of the plurality of shipments using a prediction rule specific to a carrier of the plurality of carriers, the carrier being associated with the first shipment, including:
  - detecting a first type of event for the first shipment,
  - identifying a duration that the carrier typically takes to update tracking data corresponding to an expected next action after occurrence of the first type of event,
  - determining that a time duration that exceeds the duration that the carrier typically takes to update the tracking data without detection of the expected next action for the first shipment has elapsed, the time duration specified in the prediction rule specific to the carrier, and
  - based on determining that the time duration without detection of the expected next action for the first shipment has elapsed, classifying a predicted exception for the first shipment;
- based on classifying the predicted exception for the first shipment, enhancing the shipping record for the first shipment with the predicted exception and automatically sending a notification to a party associated with the first shipment of the first predicted exception to provide the party with up-to-date information for the first shipment; and
- providing a graphical user interface to allow a remote user with permission to access the set of shipping records to view any current predicted exceptions associated with the plurality of shipments, including the predicted exception.

8. The method of claim 7, further comprising taking one or more actions resolve the predicted exception.

9. The method of claim 7, wherein automatically collecting the current shipping information comprises requesting at least a portion of the current shipping information for one or more shipments of the plurality of shipments from a first carrier system using a web service API according to a schedule based on a tracking status of the one or more shipments.

10. The method of claim 7, wherein automatically collecting the current shipping information comprises programmatically providing information identifying one or more of the plurality of shipments to a web site and downloading responsive tracking data from a web page of the web site.

11. The method of claim 7, wherein at least a portion of the current shipping information from at least one of the plurality of carriers is collected by receiving and processing shipment report files.

12. The method of claim 11, wherein the shipment report files are comma-separated or spreadsheet files.

13. A computer program product comprising at least one non-transitory computer-readable storage medium storing computer instructions that are translatable by one or more computer systems to perform:
- storing a set of shipping records for a plurality of shipments across a plurality of carriers, each shipping record in the set of shipping records associating a respective shipment from the plurality of shipments with a respective carrier from the plurality of carriers;
- connecting to a plurality of carrier systems over a network, the plurality of carrier systems including a carrier system for each of the plurality of carriers;
- automatically collecting current shipping information for the plurality of shipments from the plurality of carrier systems, wherein the current shipping information includes, for each shipment from the plurality of shipments, electronic shipment tracking data for the respective shipment according to a carrier specific format used by the respective carrier;
- defining a set of common normalized tracking codes;
- for each shipment from the plurality of shipments, mapping the electronic shipment tracking data for the respective shipment from the carrier specific format used by the respective carrier to the defined set of common normalized tracking codes to generate normalized shipping information for the respective shipment;
- for each shipment from the plurality of shipments, storing the generated normalized shipping information for the respective shipment as an event associated with the respective shipment;
- analyzing the normalized shipping information for a first shipment of the plurality of shipments using a prediction rule specific to a carrier of the plurality of carriers, the carrier being associated with the first shipment, including:
  - detecting a first type of event for the first shipment,
  - identifying a duration that the carrier typically takes to update tracking data corresponding to an expected next action after occurrence of the first type of event,
  - determining that a time duration that exceeds the duration that the carrier typically takes to update the tracking data without detection of the expected next action for the first shipment has elapsed, the time duration specified in the prediction rule specific to the carrier, and
  - based on determining that the time duration without detection of the expected next action for the first shipment has elapsed, classifying a predicted exception for the first shipment;
- based on classifying the predicted exception for the first shipment, enhancing the shipping record for the first shipment with the predicted exception and automatically sending a notification to a party associated with the first shipment of the predicted exception to provide the party with up-to-date information for the first shipment; and providing a graphical user interface to allow a remote user with permission to access the set of shipping records to view any current predicted exceptions associated with the plurality of shipments, including the predicted exception.

14. The computer program product of claim 13, wherein the computer instructions are translatable by the one or more computer systems to further perform:

taking one or more actions to resolve the predicted exception.

15. The computer program product of claim 13, wherein collecting the current shipping information comprises requesting at least a portion of the current shipping information for one or more shipments of the plurality of shipments from a first carrier system using a web service API according to a schedule based on a tracking status of the one or more shipments.

16. The computer program product of claim 13, wherein collecting the current shipping information comprises programmatically providing information identifying one or more of the plurality of shipments to a web site and downloading responsive tracking data from a web page of the web site.

17. The computer program product of claim 13, wherein at least a portion of the current shipping information from at least one of the plurality of carriers is collected by receiving and processing shipment report files.

18. The system of claim 1, wherein the first predicted exception is a transit delay exception.

19. The system of claim 18, wherein the transit delay exception is determined based on a duration of time elapsing after the first type of event without detecting the expected next action.

\* \* \* \* \*

UNITED STATES PATENT AND TRADEMARK OFFICE
CERTIFICATE OF CORRECTION

PATENT NO. : 11,605,048 B2
APPLICATION NO. : 15/836354
DATED : March 14, 2023
INVENTOR(S) : Olivier Jean Marie Modica et al.

It is certified that error appears in the above-identified patent and that said Letters Patent is hereby corrected as shown below:

In the Claims

At Column 17, Line 54, "first predicted exception" should be -- predicted exception --.

Signed and Sealed this
Fifth Day of November, 2024

Katherine Kelly Vidal
*Director of the United States Patent and Trademark Office*